(No Model.)
E. J. WOOD.
DYNAMOMETER.
No. 495,175. Patented Apr. 11, 1893.
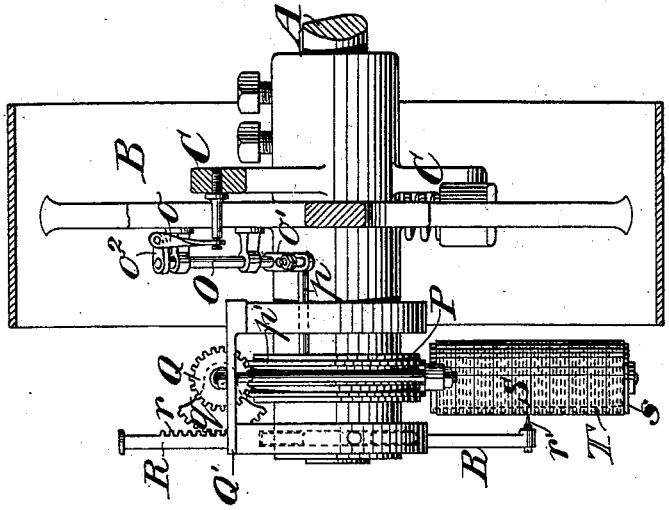
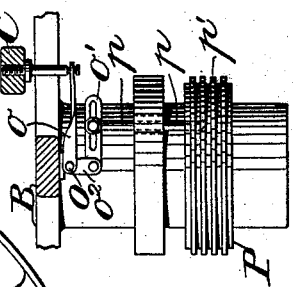
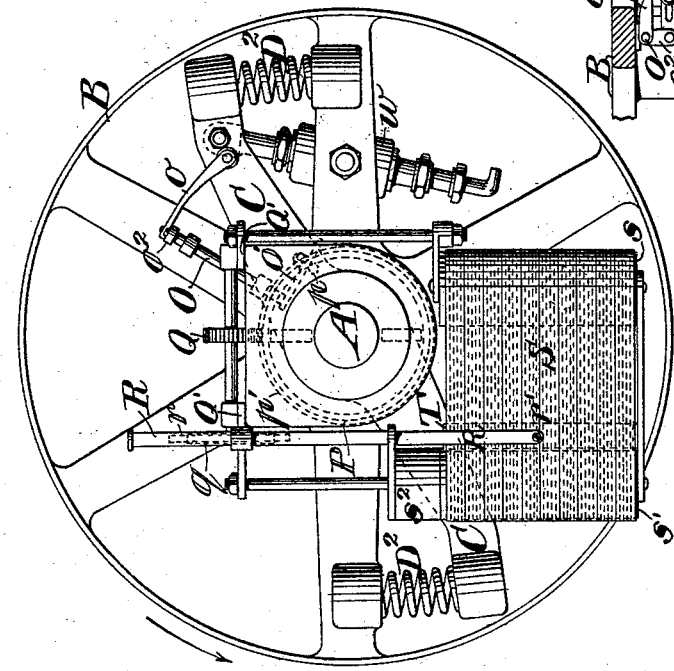
Witnesses:
C. E. Sundgren
George Barry.
Inventor:
Edgar J. Wood
by attorneys
Brown & Seward

United States Patent Office.

EDGAR J. WOOD, OF NEW YORK, N. Y.

DYNAMOMETER.

SPECIFICATION forming part of Letters Patent No. 495,175, dated April 11, 1893.

Application filed March 31, 1892. Serial No. 427,157. (No model.)

*To all whom it may concern:*

Be it known that I, EDGAR J. WOOD, of New York, in the county and State of New York, have invented a new and useful Improvement in Dynamometers, of which the following is a specification.

My invention relates to an improvement in dynamometers in which the marker and the material to receive the record do not revolve together with the power transmitting and power applying mechanisms but remain fixed relative to the rotary parts.

A practical embodiment of my invention is represented in the accompanying drawings in which—

Figure 1 is a front view of the power applying and power transmitting mechanism with the recording mechanism in position as in use. Fig. 2 is a view in side elevation, partly in section and Fig. 3 is a top plan view in detail, partly in section, showing the connection between the power applying device and the recording mechanism.

In the present embodiment of my invention I have shown a pulley B for applying the power from a source of power, not shown, to a shaft A for transmitting the power to any mechanism where it is desired to utilize it. The pulley B is loosely mounted on a shaft and is connected therewith by means of springs $D^2$ located between arms C fixed to rotate with the shaft and suitable bearings on the pulley B. By means of this connection, when power is applied to the pulley B to rotate it in the direction of the arrow, it will cause the arms C and hence the shaft A to rotate so soon as the springs $D^2$ have been compressed sufficiently to overcome the resistance of the shaft A. A rock shaft O is mounted in suitable bearings on the pulley B and has a crank arm $o^2$ at one end connected by a link $o$ with the arm C. At the opposite end the shaft O is provided with a crank arm $o'$ having an ordinary slot and pin connection with a bar $p$ extending along the hub of the pulley B and attached to a sliding sleeve or collar P mounted on the hub. The sleeve or collar P is provided with a series of annular teeth or ribs $p'$ adapted to intermesh with the teeth of a spur wheel Q mounted in a frame Q' fixed relatively to the rotary movement of the hub of the pulley B and the collar P mounted thereon. There is fixed to rotate with the spur wheel Q a toothed sector $q$, the teeth of which are adapted to intermesh with the teeth of a rack $r$ on the sliding bar R which latter carries the marker $r'$.

The material to receive the record is shown in the present instance as a flexible strip S adapted to be unwound from the supply roll $s$ and wound onto a receiving roll $s'$ by means of an ordinary clock work $s^2$ adapted to rotate the roller $s'$. At the point where the record receiving material S passes beneath the point of the marker $r'$ there is located a platen T over which the strip of material is drawn and on which it rests when the marker is engaged with it. A dash pot $w$ is employed to prevent the sudden collapsing and expanding of the springs $D^2$.

In operation, the varying loads placed upon the shaft A requiring greater or less force to carry them and the consequent varying movements of the pulley B relative to the shaft, will rotate the rock shaft O more or less according as the load is heavier or lighter and through the connection of the rock shaft O with the sliding collar or sleeve P will rotate the spur wheel Q and hence through the sector $q$ will slide the bar B and the marker carried thereby more or less across the record receiving strip S as it is moved along continuously by the clock work $s^2$. It is obvious that the power might be applied to the shaft A and the pulley B employed to transmit it to the point where it is to be utilized, if so desired, such arrangement being a simple reversal of that hereinbefore described.

It is obvious that slight changes might be resorted to in the form and arrangement of the several parts herein described with out departing from the spirit and scope of my invention, hence I do not wish to limit myself strictly to the form and arrangement herein set forth, but

What I claim is—

1. In combination, a shaft, a pulley loosely mounted on the shaft, a yielding connection between the shaft and pulley, a sliding toothed collar carried on the hub of the pulley, a connection between the sliding collar and the shaft and pulley, a recording mechanism, independent of the shaft and pulley, a spur wheel adapted to intermesh with the sliding toothed collar and a connection between the spur wheel and the recording mechanism, substantially as set forth.

2. In combination, a pulley, a shaft on which the pulley is mounted, a yielding connection between the pulley and shaft, a rock shaft carried by the pulley, a connection between the rock shaft and the first named shaft, a sliding collar on the hub of the pulley, a connection between the sliding collar and the rock shaft, a spur wheel mounted independently of the pulley and adapted to engage with the sliding collar, a rack under the control of the spur wheel, a marker carried by the rack and a record receiving sheet adapted to engage the marker, substantially as set forth.

EDGAR J. WOOD.

Witnesses:
FREDK. HAYNES,
GEORGE BARRY.